United States Patent [19]

Montagu

[11] Patent Number: 4,874,215
[45] Date of Patent: Oct. 17, 1989

[54] TUNABLE RESONANT MECHANICAL SYSTEM

[75] Inventor: Jean I. Montagu, Brookline, Mass.

[73] Assignee: General Scanning, Inc., Watertown, Mass.

[21] Appl. No.: 41,786

[22] Filed: Apr. 23, 1987

[51] Int. Cl.$^4$ .................... G02B 26/10; H02K 33/00; H02K 11/00; F16K 1/14
[52] U.S. Cl. ..................... 350/6.6; 350/487; 350/637; 310/36; 310/68 C; 267/154; 248/901
[58] Field of Search ............... 350/6.6, 486, 487, 637, 350/253, 6.5, 606, 631, 638, 639; 267/273, 154, 182; 248/DIG. 1; 33/125 T, 612, DIG. 19; 310/68 C, 36

[56] References Cited

U.S. PATENT DOCUMENTS

| | | | |
|---|---|---|---|
| 2,488,734 | 11/1949 | Mueller | 171/119 |
| 2,570,125 | 10/1951 | Hoare et al. | 177/311 |
| 2,640,866 | 6/1953 | Powell | 171/95 |
| 2,928,057 | 3/1960 | Jarger | 333/71 |
| 3,102,233 | 8/1963 | Charbonneaux | 324/125 |
| 3,256,769 | 6/1966 | Matthews et al. | 88/14 |
| 3,532,408 | 10/1970 | Dostal | 350/6 |
| 3,619,028 | 11/1971 | Keene | 350/6.7 |
| 3,678,308 | 7/1972 | Howe | 310/36 |
| 3,742,234 | 6/1973 | Laakman | 250/235 |
| 3,811,748 | 5/1974 | Treuthart | 350/7 |
| 3,820,040 | 6/1974 | Berry et al. | 331/156 |
| 3,921,045 | 11/1975 | Reich et al. | 318/127 |
| 4,032,888 | 6/1977 | Broyles et al. | 340/146.3 F |
| 4,037,231 | 7/1977 | Broyles et al. | 346/108 |
| 4,063,287 | 12/1977 | Van Rosmalen | 358/128 |
| 4,073,567 | 2/1978 | Lakerveld et al. | 350/285 |
| 4,302,720 | 11/1981 | Brill | 324/146 |
| 4,358,789 | 11/1982 | Confer | 358/140 |
| 4,364,000 | 12/1982 | Burke, Jr. | 318/128 |
| 4,370,019 | 1/1983 | Shirasaki | 350/6.6 |
| 4,502,752 | 3/1985 | Montagu | 350/6.6 |

FOREIGN PATENT DOCUMENTS 804694 3/1958 United Kingdom ............ 35/

OTHER PUBLICATIONS

Elements of Materials Science and Engineering, Van Vlack, Fifth Ed., 1985, pp. 161–164.
Schetky "Shape-Memory Alloys" (1979), Scientific American, vol. 241, No. 5.
Wayman, "Some Applications of Shape-Memory Alloys " (1980), vol. 32, No. 6, Journal of Metals.
Raychem, "Control Design with VEASE", and Tinel.
Kaufman et al., "Internal Vibration Absorption in Potential Structural Materials", MIT pp. 547–561.
Tweed, "Linearizing Resonant Scanners", Lasers and Applications, (1985), pp. 65–69.
Tweed, "Resonant Scanner Linearization Techniques", Laser Scanning and Recording, (1984), p. 161.
Pelsu, "Precision, Post-Objective, Two Axis Galvanometer Scanning", (1983) SPIE vol. 390-High Speed Read/Write Techniques for Advanced Printing and Data Handling.
Reich et al., "Precision Digital Position Encoding for Resonant Scanners", SPIE, vol. 498, Laser Scanning and Recording, 1984, pp. 169–174.
Schermer, U.S. patent appln. Ser. No. 932,654, Tunable Resonant Device.
Stokes, U.S. patent appln. Ser. No. 893,481.

Primary Examiner—John K. Corbin
Assistant Examiner—Ronald M. Kachmarik

[57] ABSTRACT

The natural resonant frequency (and phase) of a resonant mechanical system (having an spring structure that includes a material whose elastic properties change with temperature, e.g., by at least 0.05% per °C.) is tuned to a desired value by changing the temperature of at least part of the spring structure. A two-dimensional image is generated on a surface by tunign a resonant driver (having such a temperature sensitive element) to a natural resonant frequency in coordination with modulation of a beam that is raster scanned on the surface by the resonant driver.

31 Claims, 4 Drawing Sheets

TUNABLE RESONANT MECHANICAL SYSTEM

BACKGROUND OF THE INVENTION

This invention relates to resonant mechanical systems.

The natural resonant frequency of such a system typically depends on the inertia of the moving element (e.g., a rotating mirror of a resonant beam scanner) and the spring constant of the structure (e.g., a torsion bar) that supports the moving element. The natural frequency may shift for a variety of reasons, including wear and changing environmental conditions, and changes of spring constant or inertia value that occur with angular excursion or as the result of shifts in orientation relative to gravity.

It is known to adjust the natural frequency from time-to-time, after interrupting the motion of the device, by increasing the tension on the support structure, e.g., by tightening a set screw or by increasing or decreasing the inertia value. It is also known to adjust natural frequency by a controllable magnetic spring which supplements or bucks the mechanical spring.

In Shirasaki, U.S. Pat. No. 4,370,019, the resonant frequency of a resonant scanner having a torsion bar suspension is stabilized by controlling the temperature of the scanner.

It has also been proposed to adjust the natural frequency by attaching a bimetallic strip to the resonant system in such a way that the inertia of the mass, and hence the frequency, changes as the temperature of the bimetallic strip changes.

SUMMARY OF THE INVENTION

The invention enables the natural resonant frequency of motion of a resonant mechanical system (and the phase of its motion relative to a reference phase) to be adjusted remotely and dynamically while the system in in resonant motion. In applications such as large scale image display (e.g., laser TV), the dynamic tunability allows the motion of a high-speed resonant beam scanner to be precisely synchronized in frequency and phase with the modulation of the scanned beam (which itself may shift as much as 1% or more over time). Changes in resonant frequency caused by wear, shift in environmental conditions, or otherwise can also be compensated. Manufacturing tolerances of mechanical parts may be relaxed with the desired resonant frequency being obtained after assembly. A relatively wide range of tunability is achieved.

A general aspect of the invention is a resonant mechanical system in which a movable mass is urged toward a nuetral position (within a range of excursion) by a spring structure which includes a material whose elastic properties change with temperature over a desired tuning range; and the natural resonant frequency is tuned by controllably varying the temperature of at least part of the spring structure within the range.

Preferred embodiments include the following features. The elastic modulus changes with temperature by at least 0.05% per °C. (more preferably at least 0.1% per °C.). The mass (e.g., an optical element) is supported by the spring structure (e.g., a torsion bar colinear with an axis of rotation) for rotational motion within the range of excursion. A pair of generally colinear torsion bars extend in opposite directions from the mass to a supporting base. The torsion bars are made of a shape memory alloy, such as Ni-Ti (e.g., Nitinol) or Al-Ni-Cu or Cu-Zn-Al. In some embodiments, one torsion bar has an elastic modulus that is substantially constant with temperature, and the spring modulus of the other torsion bar varies with temperature. In some embodiments, one bar has two segments, one with a substantially constant spring modulus, the other with a temperature-varying spring modulus. Changes in the temperature of the elastic structure are made remotely and dynamically while the mechanical system is in resonant motion. The temperature is controlled by a housing that encloses the spring structure. The tuner detects the present resonant frequency (or phase) of motion and controls the temperature on the basis of the difference between the current frequency (phase) and a reference frequency (phase).

Another general aspect of the invention is a system for generating a two-dimensional image on a surface, in which an optical element disposed in the path of a beam is moved resonantly to achieve raster scanning of the beam on the surface; the beam is modulated in accordance with the details of the image and a temperature sensitive element (having elastic properties that change with temperature by at least 0.05% per °C.) is tuned to maintain the natural resonant frequency at a value that is coordinated with the modulation of the beam.

Other advantages and features will become apparent from the following description of the preferred embodiment, and from the claims.

DESCRIPTION OF THE PREFERRED EMBODIMENT

We first briefly describe the drawings.

DRAWINGS

STRUCTURE AND OPERATION

Figure 1:
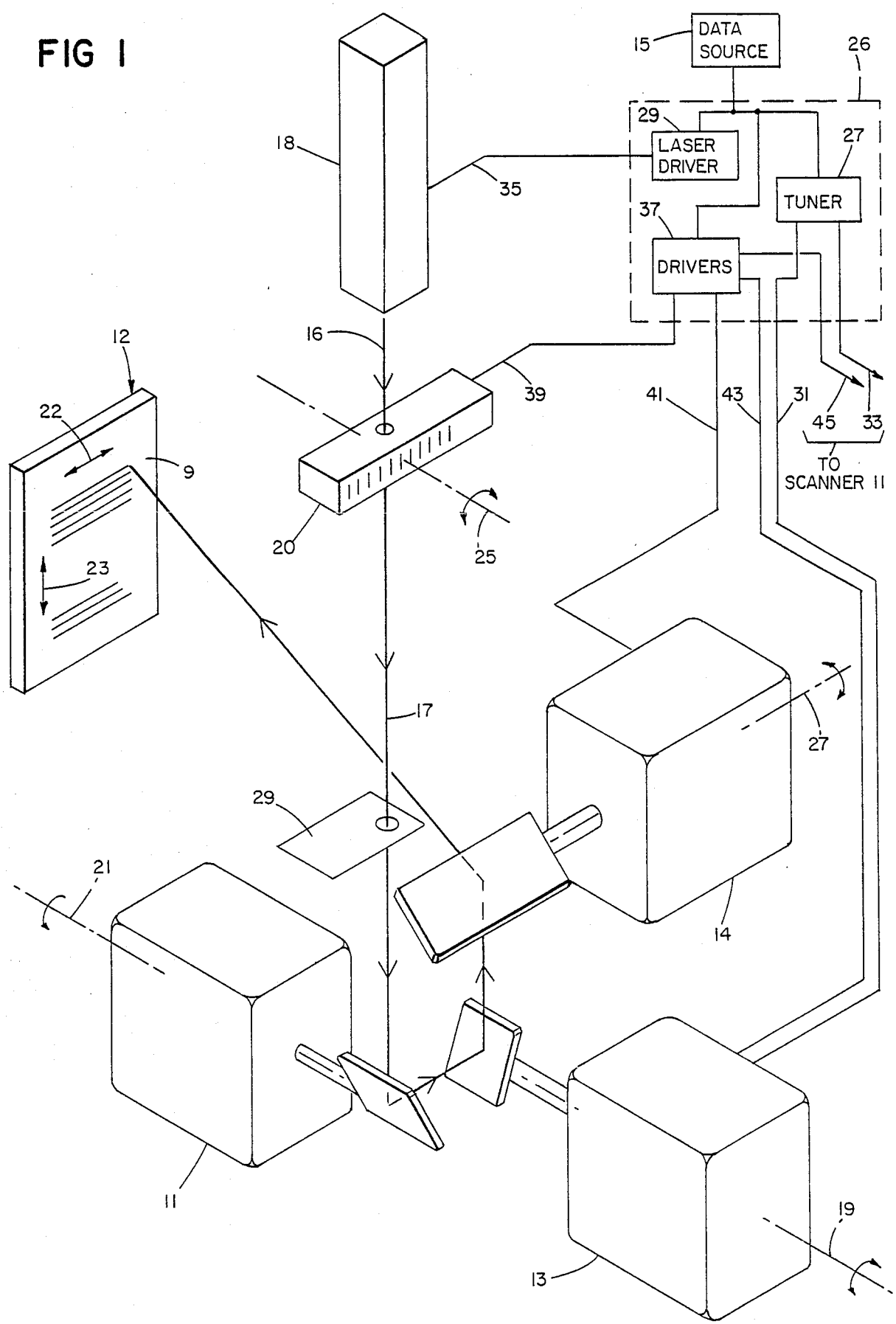
FIG. 1 is a perspective diagrammatic view of a laser TV scanning system.

Referring to FIG. 1, in a so-called large screen TV display system 10, an image 9 (e.g., an image in a sequence of video images from a television data source 15) is raster scanned line by line (in the direction of arrow 22) and frame by frame (in the direction of arrow 23) on a screen 12 by a beam from a laser source 18. The line by line scanning of each frame is achieved by a combination of three scanners 11, 13, 14 and an acousto-optic (AO) modulator deflector 20.

In order to scan each line, low frequency resonant scanner 13 oscillates sinusoidally about an axis 19 at half the fundamental repetition rate of the lines in the data delivered from source 15 (e.g., at 7867 Hz for television data). The data is configured in relation to the scanner motion in accordance with Confer, U.S. Pat. No. 4,358,789, issued Nov. 9, 1982, and incorporated herein by reference. A high frequency resonant scanner 11 oscillates sinusoidally (about an axis 21 parallel to axis 19) in synchronism with, at three times the frequency of, and with 1/9 the amplitude of scanner 13. Modulator deflector 20 rotates beam segment 17 about an axis 25 (also parallel to axis 19) and at amplitude, frequencies and phase which are the sum of all other Fourier expansion components (where the largest excursion is 1/25 of that of the fundamental) such that the combined beam rotation imparted by all three beam deflectors 11, 13, 20 represents a periodic triangular wave for scanning the lines. The article Reich et al., "Precision Digital Position Encoding for Resonant Scanners", SPIE, Vol. 498, *Laser Scanning and Recording* (1984) p. 169, and Keene, U.S. Pat. No. 3,619,028, issued Nov. 9, 1971, both incorporated herein by reference, describe how the triangular wave results from such a combination of scanners. To reposition the beam for each successive scan line, galvanometric frame scanner 14 has a sawtooth motion (about axis 27) at the frame rate (e.g., 30 Hz for television frame) and in synchronism.

Modulator deflector 20 also modulates the intensity of beam 16 from laser source 18 in accordance with intensity data from a controller 26 to produce modulated beam segment 17. Rejection shield 29 interrupts the zero order beam emanating from modulator deflector 20 and allows the first order beam 17 to pass.

Deflectors 20, 11, 13, 14 are driven and synchronized by controller 26 such that both forward and return scan motions are used to scan the frames.

Controller 26 includes a tuner 27 which is connected to scanners 11, 13 by links 33, 31. The links, among other things, carry temperature control signals to each scanner to control its resonant frequency and phase of motion, and also return signals from a conventional sensor (in each scanner) to tuner 27 indicative of the current frequency, phase, amplitude, and velocity of its motion or position of its armature. The temperature control signals from tuner 27 are based on the difference between the current phase and a reference phase and the difference between the current frequency and a reference frequency for the scanner. The reference frequency and phase are those which will produce the desired motion of each scanner in accordance with the Fourier expansion technique (discussed in the Reich et al. article) to achieve proper scanning synchronized with the rate of the image data received by tuner 27 from source 15. The rate of the image data may fluctuate, e.g., 1%, or even more. Any failure of the scanners to track the data rate will cause potentially unacceptable distortion of the image.

Controller 26 also includes a laser driver 29 which is connected over line 35 to modulate laser 18 in accordance with the data from source 15, and drivers 37 which are connected to lines 39, 41, 43, 45 to provide drive signals to deflector 20 and scanners 14, 13, and 11.

Figure 2:
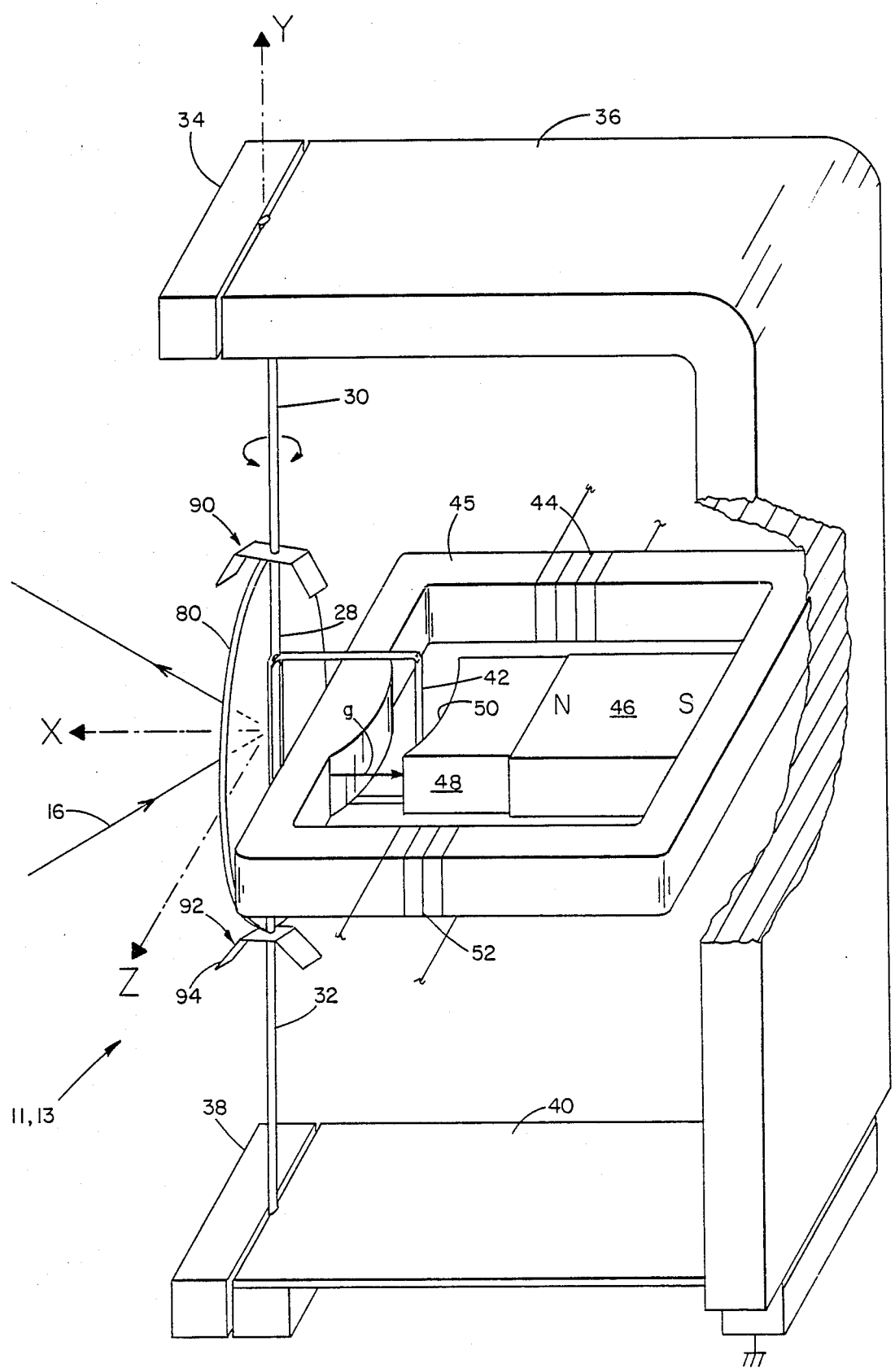
FIG. 2 is a perspective view, partially broken away, of a resonant scanner with housing.

Referring to FIG. 2, each scanner 11, 13 is generally of the type described in Montagu, U.S. Pat. No. 4,502,752, issued Mar. 5, 1985, and incorporated herein by reference. Mirror 80 is mounted on a rod 28 which is supported by two torsion bars 30, 32. (Note that in FIG. 1 the mirror is shown diagrammatically mounted on the end of a rod). Torsion bars 30, 32 are each 1-inch long, $\frac{1}{8}$" diameter Ni-Ti alloy (available from Raychem Inc., of Menlo Park, Calif. under the name Nitinol); one end of torsion bar 30 is soldered to rod 28 and the other end is held by a clamp 34 to an L-shaped aluminum support 36. One end of torsion bar 32 is fastened to rod 28 and the other end is held in tension (5 lb. pull) by a clamp 38 attached to a pre-stressed spring steel blade 40. Blade 40 is attached at its other end to support 36. A copper or aluminum conductive loop 42 is soldered to rod 28.

At each of the joints between each torsion bar 30, 32, and the rod 28, a metal tuning strip 90, 92 is attached.

Each strip 90, 92 includes tabs 94 that may be bent to alter the inertia of the rotating mass and thereby tune the nominal resonant frequency from time to time.

Loop 42, but 28, mirror 80, strips 90, 92, and torsion bars 30, 32 form a mass-spring resonant system which can rotate about the Y-axis (on which bars 30, 32 lie) with little drag through a range of motion in either direction from a neutral center position (at which mirror 80 lies in the Y-Z plane). When mirror 80 is not in the neutral position, it is urged back to the neutral position by torsion bars 30, 32 with a force proportional to the angular displacement.

The resonant system is driven by an alternating current that is induced in loop 42 from a drive coil 44 via a nickel iron ring 45 that passes through loop 42; the current reacts against a magnetic field established by a permanent magnet 46 and a pole piece 48 in the gap g between the pole face 50 and ring 45. A pick-off coil 52 provides a voltage that is indicative of the angular velocity, amplitude, and phase of the mirror 80, and is used in a feedback circuit in controller 26 that drives the mirror at a desired resonant frequency and also controls the amplitude and phase of its motion with respect to desired values.

The natural resonant frequency of scanner 11, 13 depends, among other things, on the elastic modulus of torsion bars 30 and 32. The Nitinol alloy from which torsion bars 30, 32 are formed has the characteristic that its elastic modulus varies by a factor of, e.g., 1.7 to 1, with changes in temperature of, e.g., 20° to 100° C., as indicated in Kaufman et al., "Internal Vibration Absorption in Potential Structural Materials" MIT Report, p. 547.

Figure 3:
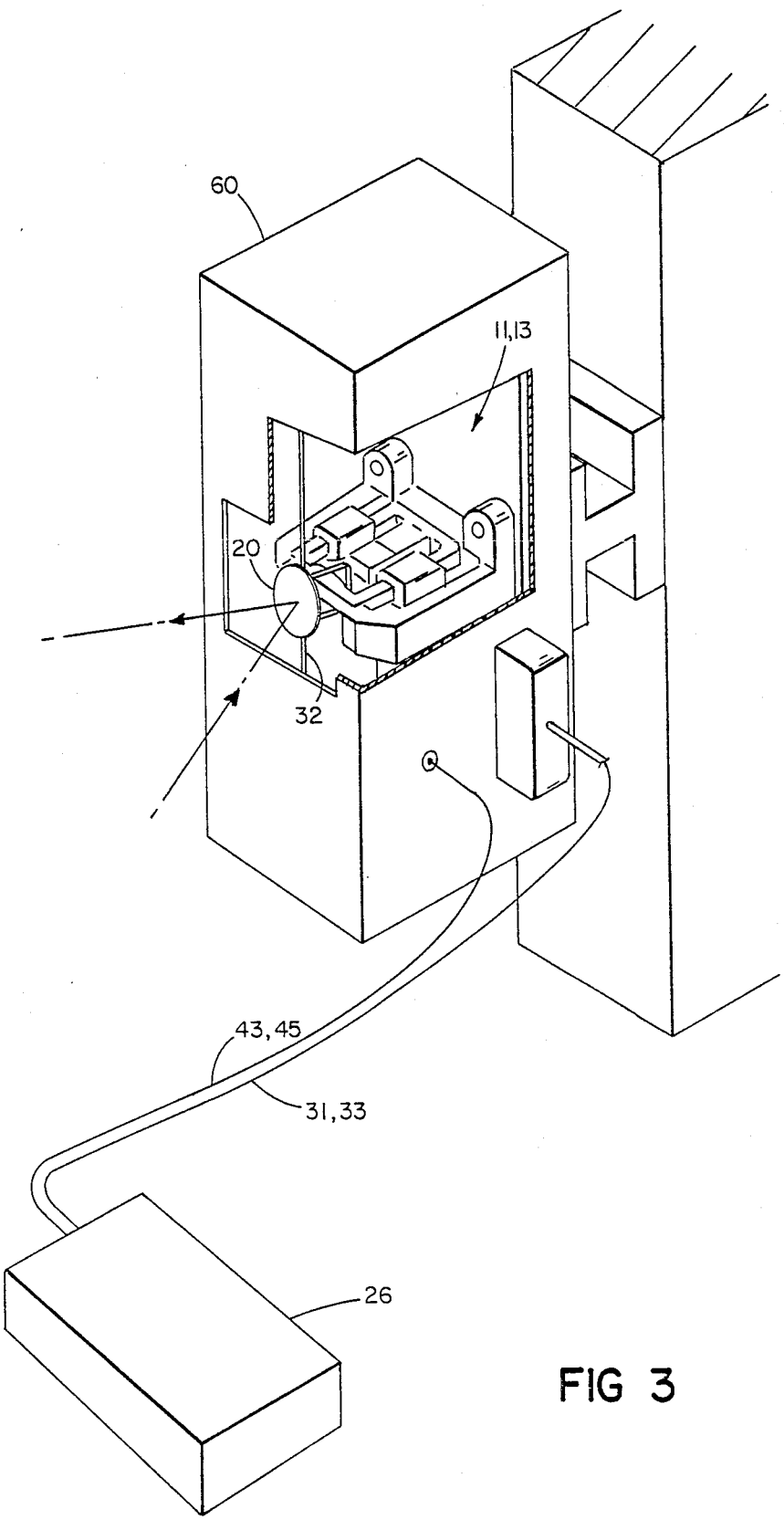
FIG. 3 is a perspective view, partially broken away, of a beam scanner.

Referring to FIG. 3, the temperature of torsion bar 32 (and hence the natural resonant frequency and phase) is controlled by enclosing scanner 24 within a box 60. A heating element (not shown) within box 60, is connected by cable 31, 33 to controller 26. The driver of scanner 24 is connected by line 43, 45 to controller 26.

The temperature is controlled to achieve any desired frequency (within the range of tunability) or phase over time, e.g., to track data source 15. Either phase or frequency feedback can be used for purposes of temperature control.

Practical constraints such as fatigue and damping properties of the material as well as convenient operating temperatures may reduce the effective tunability range.

Figure 4:
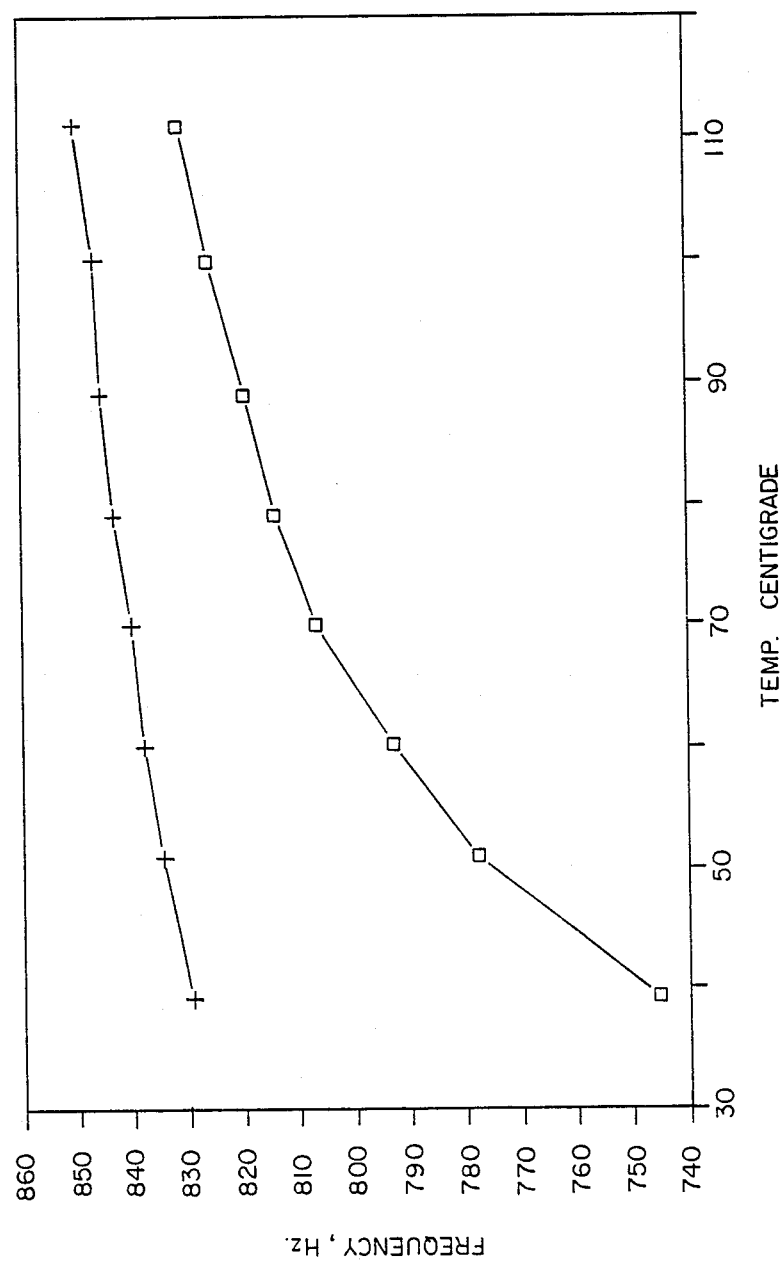
FIG. 4 are graphs of resonant frequency versus temperature.

Referring to FIG. 4, in one test of a scanner like FIG. 2, with both torsion bars made of Nitinol, the natural resonant frequency (lower curve) increased from 745 Hz at 40° C. to 830 Hz at 110° C. corresponding to a rate of change of elastic modulus of at least 0.5% per °C. Preferably (and as reflected by this example) the rate of change is at least 0.1% per °C.

In another test of a scanner like FIG. 2, with one torsion bar made of temperature stable high carbon steel (approximately 0.9% carbon, with the balance iron) instead of Nitinol, the natural resonant frequency (upper curve, FIG. 4) increased from 830 Hz at 40° C. to 850 Hz at 110° C. (Note that the presence of one conventional steel torsion bar reduces the rate of change of elastic modulus for the system.) A life test of 1.5 billion cycles at maximum design excursion of 20° peak to peak showed no sign of fatigue or failure.

By contrast a similar device, but with both torsion bars made of high carbon steel, was tested and found to exhibit a decrease in natural resonant frequency from 906 Hz to 898 Hz for the same temperature range 50° C., corresponding to a change of elastic modulus of no more than 0.03% per °C.

The ability to change the elastic modulus at a relatively rapid rate as a function of temperature and to achieve a large overall change in elastic modulus enables the frequency of resonant motion to track, e.g. the changes in data rate that result from typical variations in power line frequency.

Other Embodiments

Other embodiments are within the following claims.

Figure 5:
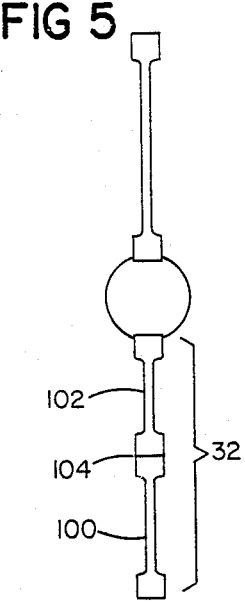
FIG. 5 is a front view of an alternative embodiment of the torsion bars.

In some embodiments (mentioned above), only one torsion bar is Nitinol, the other being steel. Alternatively, referring to FIG. 5, torsion bar 32 may be formed of two segments 100, 102 joined together at location 104 with a possible short sleeve (not shown) pressed on or epoxied to support the joint. Piece 102 could be conventional high carbon steel, while piece 100 would be Nitinol.

The temperature-sensitive (tunable) element can merely be added to other more conventional resilient suspension elements.

By thus reducing the amount of Nitinol used in the elastic structure, the range of tunability is also reduced, but the Q of the system is improved accordingly. Thus there is a design tradeoff between range of tunability and Q.

The torsion bar temperature could be controlled by other techniques, including resistance heating of the torsion bar.

The invention applies to other types of resonant mechanical systems, including those using bending blades or cross flexures for support.

Any material whose elastic modulus varies appreciably with temperature could be used instead of Nitinol, including Cu-Ni-Al and Cu-Zn-Al alloys or any other materials which may or may not be so-called shape memory alloys. Similarly plated, clad or other elastic, metallic or nonmetallic constructions with similar properties can be used if they exhibit an elastic modulus which varies appreciably with temperature (i.e., at least 0.05% per °C., preferably at least 0.1% per °C.)

If the maximum scanning angle is small enough (<10°) the high-frequency resonant scanner 11 can be eliminated without adversely affecting the linearity of the scanning.

The phase and frequency of the tunable scanner can be tuned to other external devices, including other linear or rotational scanners, or to an external clock.

I claim:

1. A resonant mechanical system whose natural resonant frequency can be tuned, comprising
   a mass movable within a range of excursion,
   a spring structure for urging said mass toward a neutral position within said range of excursion,
   said spring structure being comprised of a material whose elastic properties change with temperature over a desired tuning range, and
   a tuner for detecting a frequency of said mechanical system, and for controllably varying the temperature of at least part of said spring structure in response to said detected frequency to tune said natural resonant frequency.

2. The system of claim 1 wherein the elastic modulus of said material changes with temperature by at least 0.05% over said tuning range.

3. The system of claim 2 wherein said elastic modulus changes with temperature by at least preferably 0.1% per °C.

4. A rotational resonant scanning system for scanning a beam across a surface, said scanner having a tunable natural resonant frequency, comprising
   an optical element disposed in the path of said beam and rotatable within a range of excursion,
   a spring structure for urging said optical element toward a nuetral position within said range of excursion,
   said spring structure being comprised of a material whose elastic properties change with temperature over a desired tuning range, and
   a tuner for detecting a frequency of said mechanical system, and for controllably varying the temperature of the said spring structure in response to said detected frequency to tune the natural resonant frequency.

5. The system of claim 1 or 4 wherein said material comprises a shape memory alloy.

6. The system of claim 1 or 4 wherein said material comprises one of either Ni-Ti or Cu-Zn-Al or Ni-Al-Cu.

7. The system of claim 1 or 4 wherein said tuner detects the present frequency of resonance of said mechanical system and controls said temperature on the basis of the difference between said current frequency and a reference resonant frequency.

8. A system for generating a two-dimensional image on a surface by raster scanning a beam on said surface, comprising
   an optical element disposed in the path of said beam,
   a resonant drive for moving said optical element in resonant motion to achieve said raster scanning, said resonant drive comprising a temperature sensitive element for changing the resonant frequency of said drive, said temperature sensitive element having an elastic modulus that changes with temperature by at least 0.05% per °C. and
   a controller for modulating said beam in accordance with the details of said image and for tuning said temperature sensitive element to maintain said natural resonant frequency at a value that is coordinated with said modulation.

9. A resonant mechanical system comprising
   a mass rotatable within a range of angular excursion relative to a stationary base,
   a pair of colinear torsion bars each attached at one end to said mass and at its other end to said base, said bars extending away from said mass respectively in opposite directions, said bars comprising a support structure arranged to urge said mass toward a neutral position, said support structure being characterized by an elastic modulus that varies controllably with temperature by at least 0.05% per °C., and
   a controller for dynamically tuning the natural resonant frequency of said system while said mass is in resonant motion, by changing the temperature of at least a portion of said support structure.

10. A resonant mechanical system whose natural frequency can be tuned, comprising
    a mass movable within a range of excursion,
    a spring structure for urging said mass toward a neutral position within said range of excursion,
    said spring structure being comprised of a material whose elastic modulus changes with temperature over a desired tuning range, and a tuner for detecting a frequency of said mechanical systems and for controllably varying the temperature of at least part of said spring structure to tune said natural resonant frequency.

11. A resonant mechanical system whose natural resonant frequency can be tuned, comprising:
a mass movable within a range of excursion,
a spring structure for urging said mass toward a neutral position within said range of excursion,
said spring structure being comprised of a material whose elastic modulus changes with temperature by at least 0.05% over a desired tuning range, and
a tuner for controllably varying the temperature of at least part of said spring structure to tune said natural resonant frequency.

12. A resonant mechanical system whose natural resonant frequency can be tuned, comprising:
a mass movable within a range of excursion,
a spring structure for urging said mass toward a neutral position within said range of excursion,
said spring structure being comprised of a shape memory alloy material whose elastic properties change with temperature over a desired tuning range and
a tuner for controllably varying the temperature of at least part of said spring structure to tune said natural resonant frequency.

13. A resonant mechanical system whose natural resonant frequency can be tuned, comprising:
a mass movable within a range of excursion,
a spring structure for urging said mass toward a neutral position withn said range of excursion,
said spring structure being comprised of one of either Ni-Ti or Cu-Zn-Al or Ni-Al-Al-Cu whose elastic properties change with temperature over a desired tuning range, and
a tuner for controllably varying the temperature of at least part of said spring structure to tune said natural resonant frequency.

14. A resonant mechanical whose natural resonant frequency can be tuned, comprising
a mass movable within a range of excursion,
a spring structure for urging said mass toward a neutral position within said range of excursion,
said spring structure being comprised of a material whose elastic properties change with temperature over a desired tuning range, and
a tuner for detecting the current frequency of resonance of said mechanical system and, for controllably varying the temperature of at least part of said spring structure within said range to tune said natural resonant frequency in response to the difference between said current frequency and a reference resonant frequency.

15. A rotational resonant scanner for scanning a beam across a surface, said scanner having a tunable natural resonant frequency, comprising
an optical element disposed in the path of said beam and rotatable within a range of excursion,
a spring structure for urging said optical element toward a neutral position within said range of excursion,
said spring structure being comprised of a shape memory alloy material whose elastic properties change with temperature over a desired tuning range, and
a tuner for controllably varying the temperature of the said spring structure to tune the natural resonant frequency.

16. A rotational resonant scanner for scanning a beam across a surface, said scanner having a tunable natural resonant frequency, comprising
an optical element disposed in the path of said beam and rotatable within a range of excursion,
a spring structure for urging said optical element toward a neutral position within said range of excursion,
said spring structure being comprised of one of either Ni-Ti or Cu-Zn-Al or Ni-Al-Cu whose elastic properties change with temperature over a desired tuning range, and
a tuner for controllably varying the temperature of the said spring structure to tune the natural resonant frequency.

17. A rotational resonant scanner for scanning a beam across a surface, said scanner having a tunable natural resonant frequency, comprising
an optical element disposed in the path of said beam and rotatable within a range of excursion,
a spring structure for urging said optical element toward a neutral position within said range of excursion,
said spring structure being comprised of a material whose elastic properties change with temperature over a desired tuning range, and
a tuner for detecting the current frequency of resonance of said mechanical system and for controllably varying the temperature of the said spring structure within said range to tune the natural resonant frequency in response to the difference between said current frequency and a reference resonant frequency.

18. A resonant mechanical system whose natural resonant frequency can be tuned, comprising
a mass movable within a range of excursion,
a spring structure for urging said mass toward a neutral position within said range of excursion,
said spring structure being comprised of a material whose elastic properties change with temperature over a desired tuning range, and
a tuner for receiving a signal corresponding to any desired frequency and for controllably varying the temperature of at least part of said spring structure to tune said natural resonant frequency said desired frequency.

19. The system of claim 1, 11, 12, 13, or 18 wherein said mass is supported by said spring structure for rotational motion about an axis of rotation within said range of excursion.

20. The system of claim 1, 4, 11, 12, 13, 14, 15, 16, 17 or 18 wherein said spring structure comprises a torsion bar that is generally colinear with an axis of rotation.

21. The system of claim 20 wherein each said torsion bar comprises a shape memory alloy.

22. The system claim 1, 4, 11, 12, 13, 14, 15, 16, 17, or 18 wherein said spring structure comprises a pair of torsion bars that are generally colinear with said axis, one said bar extending in one direction from said mass to a stationary base, the other said bar extending in the opposite direction from said mass to said stationary base.

23. The system of claim 22 wherein each said torsion bar comprises a shape memory alloy.

24. The system of claim 22 wherein one said bar comprises a material whose elastic modulus is substantially constant with temperature, and the other said bar comprises a material whose elastic modulus varies with temperature.

25. The system of claim 24 wherein said other bar includes one segment whose elastic modulus is substantially constant with temperature and a second segment whose elastic modulus varies with temperature.

26. The system of claim 1, 4, 11, 12, 13, 14, 15, 16, 17, or 18 wherein said mass comprises an optical element for scanning a beam.

27. The system of claim 1, 4, 11, 12, 13, 14, 15, 16, 17, or 18 wherein said tuner is arranged to change said temperature dynamically while said mechanical system is in resonant motion.

28. The system of claim 1, 4, 11, 12, 13, 14, 15, 16, 17, or 18 further comprising a housing that encloses said material for controlling siad temperature.

29. The system of claim 1, 4, 11, 12, 13, 14, 15, 16, 17, or 18 wherein the phase of motion of said mechanical system depends on the temperature of said system, and said tuner changes the temperature of said system to tune said phase of motion.

30. The system of claim 29 wherein said tuner detects the present said phase of motion and controls said temperature on the basis of the difference between said present phase and a reference phase of motion.

31. The system of claim 4, 15, 16, 17, or 18 wherein said material comprises an element having a shape that changes such that its inertia relative to the axis of rotation changes with temperature.

* * * * *

UNITED STATES PATENT AND TRADEMARK OFFICE
CERTIFICATE OF CORRECTION

PATENT NO. : 4,874,215

DATED : October 17, 1989

INVENTOR(S) : Jean I. Montagu

It is certified that error appears in the above-identified patent and that said Letters Patent is hereby corrected as shown below:

On the title page:

The publication should read --Raychem, "Control Design with VEASE, and "Tinel."--

In the Abstract

Line 7, "tunign" should be --tuning--;

Col. 1, line 38, "in" should be --is--
Col. 1, line 53, "nuetral" should be --neutral--
Col. 3, line 58, "5/8" should be --1/8--
Col. 4, line 4, "but" should be --bar--
Col. 5, line 1, after "50°C." insert --to 110°C.--

In the Claims

Col. 6, claim 4, line 10, "nuetral" should be --neutral--

Signed and Sealed this

Twenty-fourth Day of September, 1991

Attest:

HARRY F. MANBECK, JR.

Attesting Officer

Commissioner of Patents and Trademarks